United States Patent
Vishwakarma et al.

(10) Patent No.: US 11,870,768 B1
(45) Date of Patent: Jan. 9, 2024

(54) CERTIFICATE-BASED TECHNIQUES TO SECURELY ONBOARD A RADIO INTERFACE UNIT

(71) Applicant: Cisco Technology, Inc., San Jose, CA (US)

(72) Inventors: Devendra Kumar Vishwakarma, North Chelmsford, MA (US); Om Prakash Suthar, Bolingbrook, IL (US); Vivek Agarwal, Chelmsford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 741 days.

(21) Appl. No.: 16/845,531

(22) Filed: Apr. 10, 2020

(51) Int. Cl.
*H04L 29/06* (2006.01)
*H04L 9/40* (2022.01)
(Continued)

(52) U.S. Cl.
CPC ...... *H04L 63/0823* (2013.01); *H04L 61/5014* (2022.05); *H04L 63/0876* (2013.01);
(Continued)

(58) Field of Classification Search
CPC ..... H04L 9/0825; H04L 9/321; H04L 9/3263; H04L 9/3268; H04L 63/0823;
(Continued)

(56) References Cited

U.S. PATENT DOCUMENTS 6,826,690 B1 * 11/2004 Hind .............. G06F 21/31
713/176
8,255,682 B2    8/2012 Zeng
(Continued)

FOREIGN PATENT DOCUMENTS

EP        2105819 A1    9/2009
WO   2016107506 A1    7/2016

OTHER PUBLICATIONS

Zeng et al., 5G Virtualized Radio Access Network Approach Based on No Stack Framework, May 25, 2017, IEEE, pp. 1-5. (Year: 2017).*

(Continued)

*Primary Examiner* — Luu T Pham
*Assistant Examiner* — Jenise E Jackson
(74) *Attorney, Agent, or Firm* — Edell, Shapiro & Finnan, LLC

(57) ABSTRACT

Presented herein are certificate-based techniques through which a Radio Interface Unit may be securely onboarded to a service provider network. In one example, a method is provided that includes obtaining, by a Dynamic Host Configuration Protocol (DHCP) server, an address assignment request for the, wherein the address assignment request comprises a vendor device certificate, a signed nonce, a non-encrypted serial number for the RIU, a signed serial number for the RIU, and a vendor identifier; validating the vendor device certificate, the signed nonce, and the signed serial number for the RIU based on a vendor root certification authority certificate; validating the non-encrypted serial number for the RIU; and generating an address assignment response based on validating the non-encrypted serial number for the RIU, the vendor device certificate, the signed nonce, and the signed serial number for the RIU.

20 Claims, 9 Drawing Sheets

(51) Int. Cl.
| | |
|---|---|
| *H04W 84/14* | (2009.01) |
| *H04W 12/08* | (2021.01) |
| *H04W 8/26* | (2009.01) |
| *H04W 12/069* | (2021.01) |
| *H04W 12/71* | (2021.01) |
| *H04L 61/5014* | (2022.01) |
| *H04L 101/622* | (2022.01) |
| *H04L 101/659* | (2022.01) |

(52) U.S. Cl.
CPC ........... *H04W 8/26* (2013.01); *H04W 12/069* (2021.01); *H04W 12/08* (2013.01); *H04W 12/71* (2021.01); *H04W 84/14* (2013.01); *H04L 2101/622* (2022.05); *H04L 2101/659* (2022.05)

(58) Field of Classification Search
CPC ........... H04L 61/5014; H04L 63/0876; H04W 12/71; H04W 12/069; H04W 8/26; H04W 12/08; H04W 84/14; H04W 12/122
See application file for complete search history.

(56) References Cited

U.S. PATENT DOCUMENTS

| | | | | |
|---|---|---|---|---|
| 9,473,941 | B1* | 10/2016 | Palin | H04W 12/069 |
| 10,205,719 | B2 | 2/2019 | Feng et al. | |
| 10,326,653 | B2 | 6/2019 | Wu et al. | |
| 10,581,717 | B2 | 3/2020 | Tejaprakash et al. | |
| 2004/0005886 | A1* | 1/2004 | Oda | H04L 63/10 455/1 |
| 2004/0122956 | A1* | 6/2004 | Myers | H04W 88/06 709/228 |
| 2005/0071677 | A1* | 3/2005 | Khanna | H04L 9/3236 726/4 |
| 2007/0073868 | A1* | 3/2007 | Nelson | H04L 67/04 709/224 |
| 2008/0151806 | A1* | 6/2008 | Bereski | H04W 24/02 370/312 |
| 2010/0250715 | A1* | 9/2010 | Shigeta | H04L 61/5014 709/220 |
| 2011/0161659 | A1* | 6/2011 | Himawan | H04L 9/006 713/156 |
| 2012/0116820 | A1* | 5/2012 | English | G06Q 40/08 705/4 |
| 2013/0067043 | A1* | 3/2013 | Gaitonde | H04L 61/35 709/220 |
| 2014/0325079 | A1 | 10/2014 | Savolainen et al. | |
| 2015/0350101 | A1* | 12/2015 | Sinha | H04L 67/10 709/226 |
| 2015/0350983 | A1* | 12/2015 | Kwok | H04L 65/1016 370/331 |
| 2016/0028628 | A1* | 1/2016 | Sun | H04L 12/6418 370/392 |
| 2016/0219502 | A1* | 7/2016 | Breton | H04W 76/16 |
| 2017/0171169 | A1* | 6/2017 | Lee | H04W 12/033 |
| 2017/0180382 | A1* | 6/2017 | Taylor | H04L 12/2803 |
| 2017/0339102 | A1* | 11/2017 | Chhuor | H04L 61/5014 |
| 2018/0227837 | A1* | 8/2018 | Starsinic | H04W 4/60 |
| 2019/0260577 | A1* | 8/2019 | Ren | H04L 9/0816 |
| 2020/0099660 | A1 | 3/2020 | Singaravelu et al. | |
| 2020/0195609 | A1* | 6/2020 | Leung | H04L 63/0236 |
| 2020/0304853 | A1* | 9/2020 | Chen | H04L 63/0236 |
| 2022/0247716 | A1* | 8/2022 | Komai | H04W 8/26 |

OTHER PUBLICATIONS

Ramantas et al., A C-Ran Based 5G Platform with a Fully Virtualized, SDN Controlled Optical/Wireless Fronthaul, Jul. 5, 2018, IEEE, pp. 1-4. (Year: 2018).*
T. Mrugalski et al., "Dynamic Host Configuration Protocol for IPV6 (DHCPv6)", Internet Engineering Task Force (IETF), Nov. 2018, 154 pages.
S. Josefsson et al., "Textual Encodings of PKIX, PKCS, and CMS Structures", Internet Engineering Task Force (IETF), Apr. 2015, 20 pages.
D. Cooper et al., "Internet X.509 Public Key Infrastructure Certificate and Certificate Revocation List (CRL) Profile", Network Working Group, May 2008, 151 pages.
R. Droms et al., "Authentication for DHCP Messages", Network Working Group, Jun. 2001, 17 pages.
S. Alexander et al., "DHCP Options and BOOTP Vendor Extensions", Network Working Group, Mar. 1997, 34 pages.
Osama S. Younes et al., "A Secure DHCP Protocol to Mitigate LAN Attacks", Journal of Computer and Communications, Scientific Research Publishing, Jan. 2016, 4, pp. 39-50.
J. Demerjian et al., "E-DHCP: Extended Dynamic Host Configuration Protocol <draft-demerjian-serhrouchni-achmelal-edhcp-00.txt>", Internet Engineering Task Force, Aug. 9, 2004, 9 pages.
Wikipedia, "DHCPv6", Wikipedia The Free Encyclopedia, 4 pages. retrieved from Internet Mar. 5, 2020; https://en.wikipedia.org/wiki/DHCPv6.
Jacques Demerjian et al., "DHCP Authentication Using Certificates", IFIP International Information Security Conference, Springer, Boston, MA, 2004.
Tadashi Komori et al., "The Secure DHCP System with User Authentication", IEEE, 9 pages.
3GPP, "3rd Generation Partnership Project; Technical Specification Group Radio Access Network; NR; NR and NG- RAN Overall Description; Stage 2 (Release 16)", 3GPP TS 38.300 V16.0.0 (Dec. 2019).
3GPP, "3rd Generation Partnership Project; Technical Specification Group Services and System Aspects; Telecommunication management; Data formats for multi-vendor plug and play eNode B connection to the network (Release 15)", 3GPP TS 32.509 V15.0.0 (Jun. 2018), 13 pages.
3GPP, 3rd Generation Partnership Project; Technical Specification Group Services and System Aspects; Telecommunication management; Procedure flows for multi-vendor plug-and-play eNode B connection to the network (Release 15), 3GPP TS 32.508 V15.0.0 (Jun. 2018), 20 pages.
OpenStack, "Image Signature Certificate Validation," Nov. 23.1.0. dev476, https://docs.openstack.org/nova/latest/user/certificate-validation.html, Dec. 13, 2019, 16 pages.
Red Hat, "Using Open SSH Certificate Authentication," https://access.redhat.com/...x/6/html/deployment_guide/sec-using_openssh_certificate_authentication#/sec-Introduction_to_SSH_Certificates, retrieved Aug. 25, 2021, 3 pages.
Wikipedia, "MD5," https://en.wikipedia.org/wiki/MD5, retrieved Apr. 13, 2020, 13 pages.
A. Bierman, et al., "Textual Conventions for Additional High Capacity Data Types, " Network Working Group, Request for Comments: 2856, Category: Standards Track, Jun. 2000, 10 pages.
Lifecycle Manager Learning Centre, "Introduction," servicelifecyclemanager.com/user-guides/cicd/introduction/, 2019, retrieved Apr. 17, 2020, 11 pages.
Cisco, "Cisco Trustworthy Technologies Data Sheet," Cisco Public, May 6, 2019, 5 pages.
D. Simon, et al., "The EAP-TLS Authentication Protocol," Network Working Group, Request for Comments: 5216, Obsoletes: 2716, Category: Standards Track, Mach 2008, 34 pages.
Rigney, C., et al., Network Working Group, "Remote Authentication Dial in User Service (RADIUS)," RFC 2865, https://datatracker.ietf.org, Jun. 2000, 76 pages.

* cited by examiner

| DHCP Msg Type | DHCPv6 option | Option Name | Fields | Sub Option Name | Sub Option Code | Sub Option Length (B) | Sub Option Value | Remark |
|---|---|---|---|---|---|---|---|---|
| DHCP Request/ Request | 16 | Vendor Class Identifier | Enterprise Number | NA | NA | 4 | 39762 | Mandatory field to be filled from Manufacturer |
| | | | Vendor Class Data | NA | NA | Length of the string | ASCII encoded string: "as-riu-reva" | These are place holders for representing different variants of the hardware; For current hardware no decisions being made on these values |
| | 17 | Vendor Specific Information | Enterprise Number | NA | NA | 4 | 39762 | Mandatory field to be filled from Manufacturer |
| | | | Optional Data | 220 RIU Serial Number | 66 | length of RIU Serial Number | ASCII string representation of RIU Serial Number | RIU Serial Number |
| | | | | 221 Signed RIU Serial Number | 67 | length of base64 format of the Signed RIU Serial Number | base64 format of the signed serial number | RIU Serial Number will be signed using Vendor provided private key and SHA256 hash Required. To authorize the device private key from Vendor at Server is utilized |
| | | | | 222 Vendor-RIU-Certificate | 68 | length of Vendor-RIU-Certificate | Vendor-RIU-Certificate (PEM format) | For Operator NW to authorize RIU device |
| | | | | 223 Signed nonce | 69 | length of base64 format of the Signed nonce | base64 format of the signed nonce | nonce received in the DHCPv6 advertise can be signed using Vendor provided private key and SHA256 hash |
| | 6 | Option Request Option | NA | NA | NA | 2* Requested options | Default Values + (option17) | Request from client to provide Vendor Specific information from Server |
| | | | | FQDN of SP CA | 2 | Length of the string | ASCII string representing SP CA FQDN | |
| | | | | Port Number of SP CA | 3 | 2 | Integer representation of Port | |

FIG 2C

| DHCP Msg Type | DHCPv6 option | Option Name | Fields | Sub Option Name | Sub Option Code | Sub Option Length (B) | Sub Option Value | Remark |
|---|---|---|---|---|---|---|---|---|
| DHCP Reply/ Response | 17 | Vendor Specific information | Enterprise Number | NA | NA | 4 | 39762 | |
| | | | Optional Data | IP address of SP CA | 1 | Length of IPv4 or IPv6 address | IP address of SP CA | |
| | | | | FQDN of SP CA | 2 | Length of the string | ASCII string representing SP CA FQDN | |
| | | | | Port Number of SP CA | 3 | 2 | Integer representation of port | |
| | | | | Path to SP CA directory | 4 | Length of the string | ASCII string representing CMP server directory | |
| | | | | Subject name of SP CA | 5 | Length of the string | ASCII string representing the subject Name of SP CA | Server shall provide the subset of these for RIU to connect to SP CA. |
| | | | | Protocol Information | 6 | Length of the string | ASCII string representing the protocol HTTP or HTTPS | |
| | | | | EMS FQDN/URL | 10 | Length of the string | ASCII string representing EMS FQDN/URL | For RIU to reach EMS |
| | | | | CA Sever issuer Root Certificate Chain (cacert) _224_ | 70 | Length of the ca cert | Root ca certificate Chain (PEM format) | For authenticating a first time, CA Server produced Root certificate Chain |
| DHCP Advertise/ Offer | 17 | Vendor Specific information | Enterprise Number | NA | NA | 4 | 39762 | |
| | | | Optional Data | nonce | 65 | Length of nonce | Random number generated to avoid replay attacks | DHCP Server will generate |

CERTIFICATE-BASED TECHNIQUES TO SECURELY ONBOARD A RADIO INTERFACE UNIT

TECHNICAL FIELD

The present disclosure relates to network equipment and services.

BACKGROUND

Networking architectures have grown increasingly complex in communications environments, particularly mobile networking environments. In some instances, a mobile network service provider can deploy a virtualized Radio Access Network (vRAN) that can include a Remote Radio Head (RRH) that utilizes a Radio Interface Unit (MU) that can be used to connect to one or more other network elements. There is currently no secure method for onboarding an MU, which could result in a rogue RIU connecting to a network.

BRIEF DESCRIPTION OF THE DRAWINGS

FIGS. 2C and 2D are diagrams illustrating example message parameters that may be utilized for various messages illustrated in FIGS. 2A and 2B, according to an example embodiment.

DESCRIPTION OF EXAMPLE EMBODIMENTS

Overview

Figure 1A:
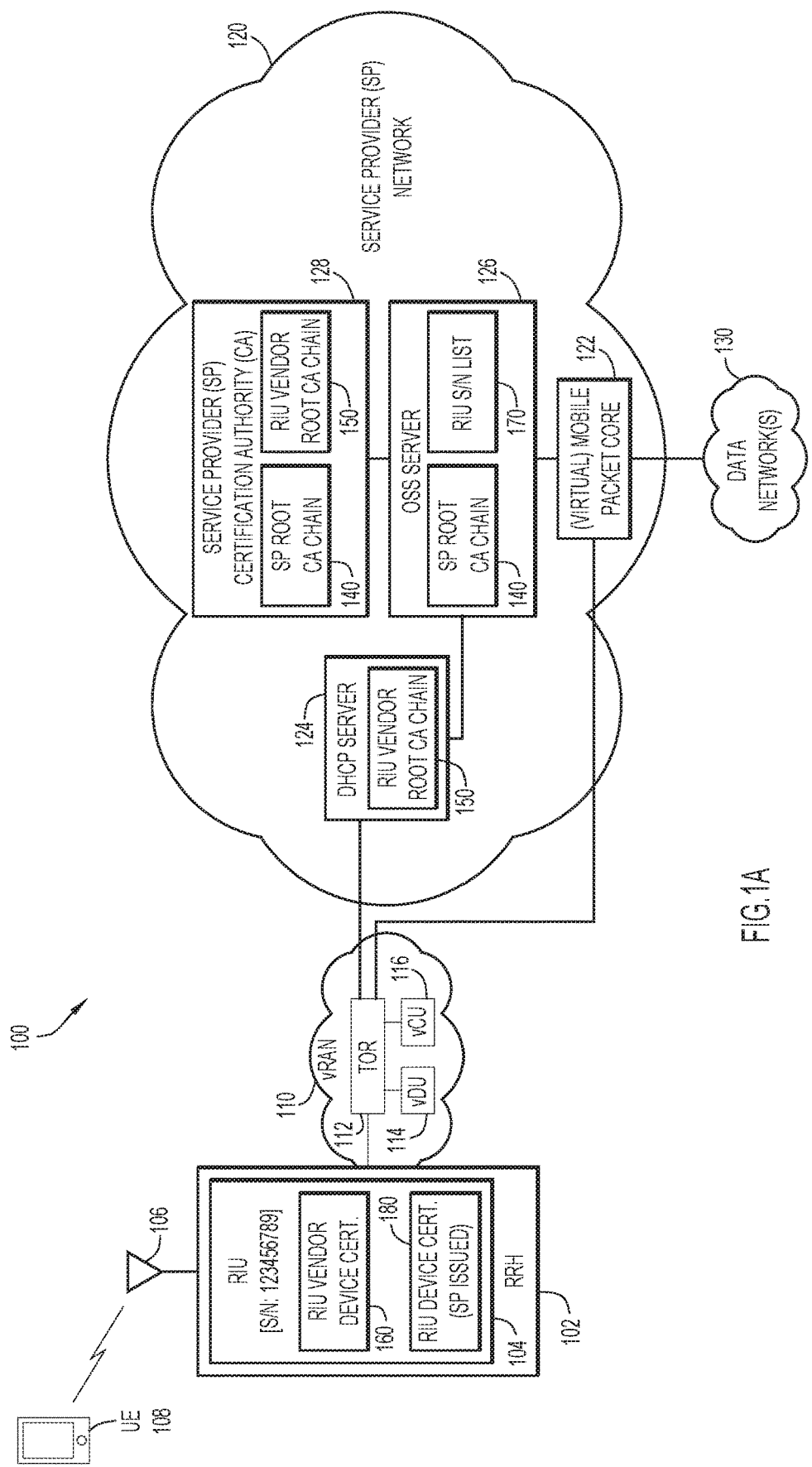
FIG. 1A is a diagram of a system in which certificate-based techniques may be utilized to facilitate secure onboarding of a radio interface unit (RIU), according to an example embodiment.

For a typical virtualized Radio Access Network (vRAN) deployment the number of Remote Radio Heads (RRHs) and corresponding Radio Interface Units (RIUs) can be in the hundreds of thousands and RIUs can be sourced from many different vendors. For a mobile network service provider (SP), the security of RIUs is important because it provides a secure perimeter for attaching to the SPs mobile network. Robust security of RIUs is therefore needed to avoid replay attacks and rouge devices.

Presented herein are certificate-based techniques that can be utilized via an enhanced Dynamic Host Configuration Protocol (DHCP) server in order to provide secure onboarding not only for an RIU but also any clients/devices using enhanced DHCP version 6 (DHCPv6) processes. Techniques presented herein can be utilized to enhance security for Third (3rd) Generation Partnership Project (3GPP) 4th Generation (4G)/Long Term Evolution (LTE) deployments, 5th Generation (5G) deployments, next Generation (nG) deployments, and/or any combinations thereof.

In an example embodiment, a method is provided that may include obtaining, by a DHCP server, an address assignment request for an RIU in which the address assignment request comprises a vendor device certificate, a signed nonce, a serial number for the MU, a signed serial number for the RIU, and a vendor identifier. The method may further include validating the vendor device certificate, the signed nonce, and the signed serial number for the RIU by the DHCP server based on a root certification authority certificate; validating the serial number for the MU; and generating, for transmitting to the MU, an address assignment response by the DHCP server based on validating the serial number for the MU, the vendor device certificate, the signed nonce, and the signed serial number for the RIU, wherein the address assignment response comprises an Internet Protocol version 6 (IPv6) address for the MU.

EXAMPLE EMBODIMENTS

A mobile network service provider (SP) can deploy a virtualized Radio Access Network (vRAN) that includes a Remote Radio Head (RRH) deployed outdoors with one or more antennas. The RRH uses a Radio Interface Unit (MU) to connect to a virtualized Digital or distributed Unit (vDU) using a Common Public Radio Interface (CPRI) protocol or evolved CPRI (eCPRI) protocol connection. The CPRI/eCPRI connection may utilize an Ethernet interface to terminate to a Top-of-Rack (TOR) switch at an edge data-center where the vDU is hosted.

During initial set-up procedures to onboard an MU for a vRAN deployment, the MU uses Dynamic Host Configuration Protocol (DHCP) address assignment processes to obtain an IP address and/or exchange any other additional parameters. There is currently no secure method of onboarding an MU for current deployments, which could result in a rouge MU being attached to the vDU. Also, current RIU onboarding processes are susceptible to man in the middle attacks.

Presented herein are certificate-based MU onboarding techniques that can be utilized to guarantee security for onboarding an MU for a vRAN deployment.

Figure 1B:
FIGS. 1B, 1C, and 1D are schematic diagrams illustrating various example details that may be associated with the certificate-based techniques provided via the system of FIG. 1A, according to an example embodiment.
Figure 1C:
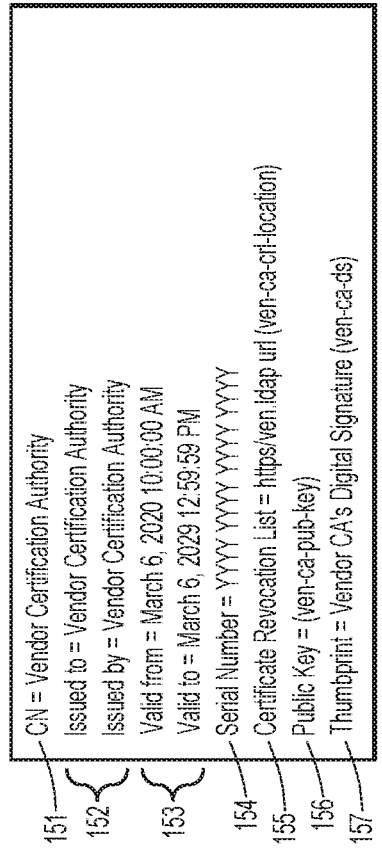
Figure 1D:
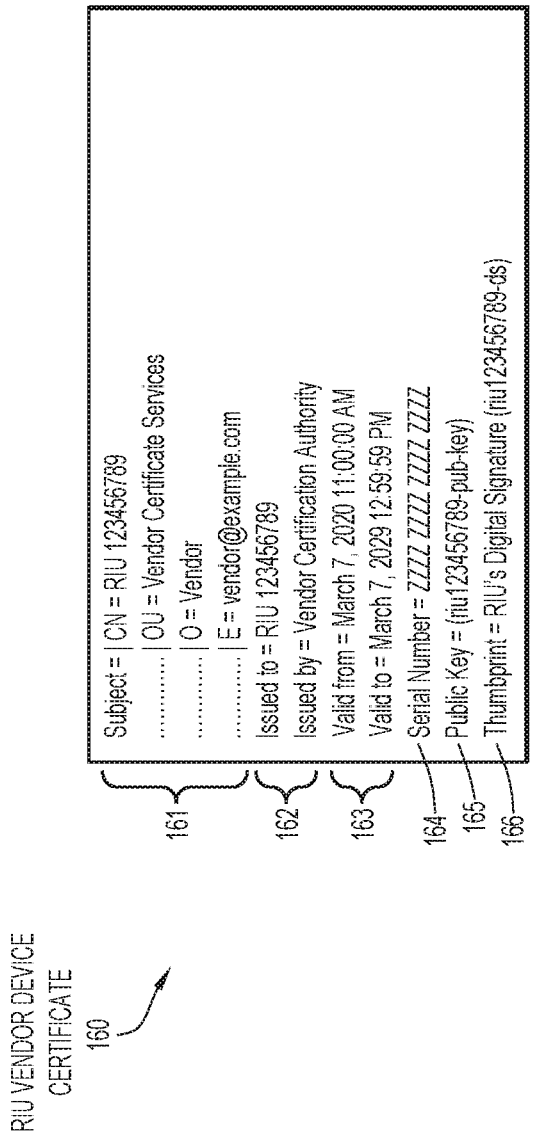

Referring to FIG. 1A, FIG. 1A is a block diagram of a system 100 in which certificate-based techniques may be utilized to facilitate secure onboarding of a RIU, according to an example embodiment. FIGS. 1B, 1C, and 1D are schematic diagrams illustrating various example details that may be associated with the certificate-based techniques provided via the system of FIG. 1A, according to an example embodiment. Reference may be made to FIGS. 1B, 1C, and 1D in association with features discussed for FIG. 1A.

System 100 may include a RRH 102 that includes an MU 104 and one or more antenna(s) or antenna assemblies 106, vRAN 110, and a service provider (SP) network 120. Also shown in FIG. 1 is a user equipment (UE) 108 and one or more data network(s) 130.

The vRAN 110 may include a Top-of-Rack (TOR) switch 112, which may interface with a vDU 114 and a virtualized Central (or Centralized) unit (vCU) 116. The SP network may include a mobile packet core 122, which may be inclusive of a virtualized mobile packet core, a DHCP server 124, an Operations Support System (OSS) server 126, and a service provider (SP) certification authority (CA) entity 128, also referred to herein interchangeably as SP CA 128.

Generally, RRH 102 may interface with vDU 114 and/or other elements of SP network 120 (such as DHCP server 124) via RIU 104 and TOR 112 in which TOR 112 may facilitate connectivity between the vRAN 110 and the SP network 120 (e.g., between TOR 112 and DHCP server 124, between TOR 112 and mobile packet core 122, etc.). Generally, TOR 112 may be implemented as a TOR switch for a rack of servers or compute nodes. TOR 112 may also facilitate connectivity between vDU 114 and vCU 116 (and/or any other elements that may be deployed in vRAN 110). It is to be understood that there can be any number of RRHs deployed within a system and that vRAN may include any number of TORs, vDUs, vCUs, etc. A service provider associated with service provider network 120 may be any telecommunications (telco) provider, cloud provider, combination of providers, etc.

For SP network 120, DHCP server 124 may interface with OSS server 126, which may further interface with SP CA 128 and mobile packet core 122. Mobile packet core 122 may further interface with one or more data network(s) 130, which may be inclusive of a packet data network (PDN), the Internet, an enterprise network, and/or the like.

In at least one embodiment, system 100 may be representative of a mobile network, which may be implemented as a Third (3rd) Generation Partnership Project (3GPP) 4th Generation (4G)/Long Term Evolution (LTE) mobile network, a 5th Generation (5G) mobile network, a next Generation (nG) mobile network, and/or any combinations thereof.

RRH 102 may terminate any combination of a cellular and/or wireless air interface for any combination of Radio Access Technology (RAT) types (sometimes referred to more generally as 'accesses') such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, and/or nG accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizen Broadband Radio Service (CBRS) accesses; combinations thereof; and/or the like. Thus, RRH 102 may be inclusive of any configuration/combination of 3GPP 4G/LTE evolved Node Bs (eNBs or eNodeBs) and/or 5G next Generation Node Bs (gNBs or gNodeBs), that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via the antenna assemblies 106 in order to provide over-the-air coverage for one or more access types (e.g., Wi-Fi®, 4G/LTE, 5G, nG, CBRS, etc.).

In general, the RIU 104 facilitates CPRI/eCPRI and/or Radio over Ethernet (RoE) connections between the RRH 102 and the vDU 114 via the TOR 112. Further, the RIU 104 is an interface unit between Radio Remote Head (RRH) and Virtualized Digital Unit (vDU). The RRH provides functions such as analog to digital conversion, filtering, power amplification and TX/RX; with the use of massive multiple input/multiple output (MIMO) and it covert analog signal to digital and forward to RIU 104. RRH Analog assembly such as amplifiers RRH interface with antenna 106.

As noted previously, in a given vRAN, there may be many thousands of RIUs in which the RIUs may be manufactured and/or provided by different vendors. In at least one embodiment, RIU 104 may be provisioned with and/or otherwise store an RIU vendor device certificate (cert) 160, which is discussed in further detail herein, below, with reference to FIG. 1D. RIU 104 may also be provisioned with and/or otherwise store a serial number (S/N or serial #) (e.g., '123456789') that may be assigned by a vendor of the RIU 104. RIU 104 may also be provisioned with and/or otherwise store a vendor identifier (ID) (e.g., 'vendor 1111') identifying the vendor. During operation, as discussed in further detail herein, below, with reference to FIGS. 2A and 2D, MU 104 may be provisioned with and/or otherwise store an MU device certificate 180 issued by the service provider of SP network 120 and may further be provisioned with and/or otherwise store a private key (e.g., 'riu123456789-pri-key') in accordance with certificate-based secure onboarding techniques provided by embodiments herein.

In at least one embodiment, vCU 116 may provide upper level operations of a radio signal processing stack, such as Packet Data Convergence Protocol (PDCP) functions and radio resource control, among others. In at least one embodiment, vDU 114 (also sometimes referred to as a baseband unit) may provide lower level operations of the radio signal processing stack, such as Radio Link Control (RLC), Medium Access Control (MAC), and physical (PHY) layer operations, such as digital processing, including signal modulation, encoding, and scheduling, among others. The split of operations of a radio signal processing stack among vDUs and vCU can be varied depending on implementation and/or configuration of a given vRAN. The RIU 104 and the vDU 114 are often tightly integrated for optimal system performance and, classically, are delivered by a single vendor over a proprietary or quasi-proprietary interface (e.g., CPRI/eCPRI/RoE).

In general, a DHCP server, such as DHCP server 124, may generate, provide, or otherwise assign Internet Protocol (IP) addresses for one or more clients of system 100 in response to DHCP solicit and/or request packets using DHCP processes. For example, in at least one embodiment DHCP server 124 may utilize DHCPv6 processes as prescribed at least by Internet Engineering Task Force (IETF) Request For Comments (RFC) 8415 in order to assign IPv6 addresses to DHCP clients, such as RIU 104 via certificate-based techniques as described herein. Thus, for embodiments herein, DHCP server 124 may be enhanced with logic and/or the like to facilitate IPv6 address assignment using certificate-based techniques as described herein. In at least one embodiment, an RIU vendor root certification authority (CA) chain 150 (discussed in further detail herein, below) can be provisioned for and/or otherwise stored by DHCP server 124.

In various embodiments, DHCP server 124 may include and/or interface with one or more databases (not shown), storage, and/or the like to facilitate operations described herein.

In general, an OSS server, such as OSS server 126 may support various functions associated with the operation of mobile packet core 122 including, but not limited to, network management and/or configuration functions, network and/or service provisioning/management functions, network and/or service inventory functions, network and/or service fault management functions, and/or the like. In various embodiments, DHCP server 124 may include and/or interface with one or more databases (e.g., memory, storage, and/or the like) and may be enhanced with logic and/or the like to facilitate certificate-based techniques described herein. In at least one embodiment, a SP root certification authority (CA) chain 140 (discussed in further detail herein, below) and an RIU serial number (S/N or serial #) list 170 may also be provisioned for and/or otherwise stored by OSS server 126. In some instances, OSS server 126 may have its own server certificate for which it may have a corresponding private key.

In various embodiments, mobile packet core 122, which may be implemented as a virtual mobile packet core in some instances, may be inclusive of any combination of a 3GPP 4G Evolved Packet Core (EPC) (sometimes referred to as an Evolved Packet System (EPS), a 3GPP 5G mobile packet core (sometimes referred using the terms 5GS or 5GC), a next Generation packet core, and/or the like as may be prescribed by 3GPP standards (e.g., 3GPP Technical Specification (TS) 23.401, 23.501, etc.). Mobile packet core 122 may facilitate mobile network connectivity for user equipment, such as UE 108, which may be inclusive of any electronic device (e.g., smart phone, laptop, vehicle, etc.) that may establish a session with mobile packet core 122 for communications with one or more data network(s) 130.

An SP CA, such as SP CA 128 may an entity that issues digital certificates for SP network 120. Generally, a digital certificate can be used to certify ownership of a public key by a named subject of a certificate. Certificates discussed for embodiments herein may have a format as prescribed by the X.509 public key infrastructure (PKI) standard as defined at least by RFC 5280. SP CA 128 may be provisioned with and/or otherwise store an SP root CA certificate 140, which may have a format as shown in FIG. 1B. As referred to herein, a root CA certificate can also be referred to interchangeably using the terms 'root CA chain' or 'root CA certificate chain'. SP CA 128 may also be provisioned with and/or otherwise store the RIU vendor root CA chain 150, which may have a format as shown in FIG. 1C.

As shown in FIG. 1B, the SP root CA chain 140 may contain various fields including, but not limited to: a common name (CN) field 141 identifying 'Service Provider Certification Authority'; issued to/by fields 142 identifying related issuance information; validity fields 143 identifying validity date/time information; a serial number field 144 identifying a serial number (e.g., 'XXXX XXX XXXX XXXX') for the SP root CA chain 140; a Certificate Revocation List field 145 identifying a location at which SP CA certificate revocation list location (sp-ca-crl-location) information may be obtained (e.g., a HyperText Transfer Protocol (HTTP) secure (HTTPS) Uniform Resource Locator (URL) such as 'https/sp.ldap url'); a public key field 146 identifying a public key (e.g., 'sp-ca-pub-key') for the SP CA 128; and a Thumbprint field 147 identifying the SP CA's digital signature (e.g., 'ca-ds'). It is to be understood that the details illustrated for the SP root CA chain 140 are provided for illustrative purpose only and are not meant to limit the broad scope of the present disclosure. Any other information and/or fields may be provided for a root CA chain in accordance with the X.509 standard in accordance with embodiments herein. The SP CA 128 may also be provisioned with and/or otherwise store a private key (e.g., 'sp-ca-pri-key').

As shown in FIG. 1C, the vendor root CA chain 150 may contain various fields including, but not limited to: a CN field 151 identifying 'Vendor Certification Authority'; issued to/by fields 152 identifying related issuance information; validity fields 153 identifying validity date/time information; a serial number field 154 identifying a serial number (e.g., 'YYYY YYYY YYYY YYYY') for the vendor root CA chain 150; a Certificate Revocation List field 155 identifying a location at which vendor CA certificate revocation list location (ven-ca-crl-location) information may be obtained (e.g., such as 'https/ven.ldap url'); a public key field 156 identifying a public key (e.g., 'ven-ca-pub-key') for the vendor CA (not shown); and a Thumbprint field 157 identifying the vendor CA's digital signature (e.g., 'ven-ca-ds'). It is to be understood that the details illustrated for the vendor root CA chain 150 are provided for illustrative purpose only and are not meant to limit the broad scope of the present disclosure. Any other information and/or fields may be provided for a root CA chain in accordance with the X.509 standard in accordance with embodiments herein.

As shown in FIG. 1D, the RIU vendor device certificate 160 may contain various fields including, but not limited to: subject fields 161 including CN information identifying 'RIU 123456789', Organizational Unit (OU) information identifying 'Vendor Certificate Services', Organization (O) information identifying the Vendor, and email (E) information identifying 'vendor@example.com' (fields 161 are often referred to as a device's 'digital identity'); issued to/by fields 162 identifying related issuance information; validity fields 163 identifying validity date/time information; a serial number field 164 identifying a serial number (e.g., 'ZZZZ ZZZZ ZZZZ ZZZZ') for the RIU vendor device certificate 160; a public key field 165 identifying a public key (e.g., 'riu123456789-pub-key') for the RIU 104, and a Thumbprint field 166 identifying the RIU's digital signature (e.g., 'riu123456789-ds'). It is to be understood that the details illustrated for the vendor root CA chain 150 are provided for illustrative purpose only and are not meant to limit the broad scope of the present disclosure.

For vRAN 110, after physical deployment (e.g., outdoors) of an eNodeB/gNodeB site includes RRH 102, antenna assemblies 106, and RIU 104, integration and onboarding of the RIU 104 is performed. The RIU 104 may use an Ethernet interface, which is terminated via TOR 112 in the vDU/vCU site (which may be different from the location/site of the RRH 102), to performing the onboarding operations. During onboarding of RIU 104, the RIU 104 is to obtain an IP address and exchange parameters using DHCP address assignment processes.

In accordance with the certificate-based techniques of embodiments herein, the DHCP address assignment process can be enhanced to exchange security parameters, information, etc. in order to secure the RIU 104 onboarding. Broadly, enhancements provided by embodiments herein may include, but not be limited to: modifying/enhancing DHCPv6 processes between RIU 104 and DHCP server 124; generating a nonce by DHCP Server 124, storing it locally and providing the nonce to RIU 104; providing a certificate-based technique to validate vendor issued client-certificate (e.g., RIU vendor device certificate 160) for RIU 104; and assigning an IPv6 address and providing a service provider issued device certificate (e.g., RIU device certificate 180) to RIU 104 in which the service provider issued certificate is sent along with the IPv6 address to RIU 104.

Various advantages may be provided by utilizing the certificate-based and nonce techniques described herein. For example, in at least one embodiment, providing/deploying nonce features may prevent against potential replay attacks from rogue RIUs. In another example, client certificate validation may prevent any rouge RIUs from attaching to the network. In yet another example, a certificate authority Fully Qualified Domain Name (FQDN) exchange allows an MU to get a new certificate from a service provider's certification authority during onboarding, which provides for securing future communications of the RIU in the service providers network.

Figure 2A:
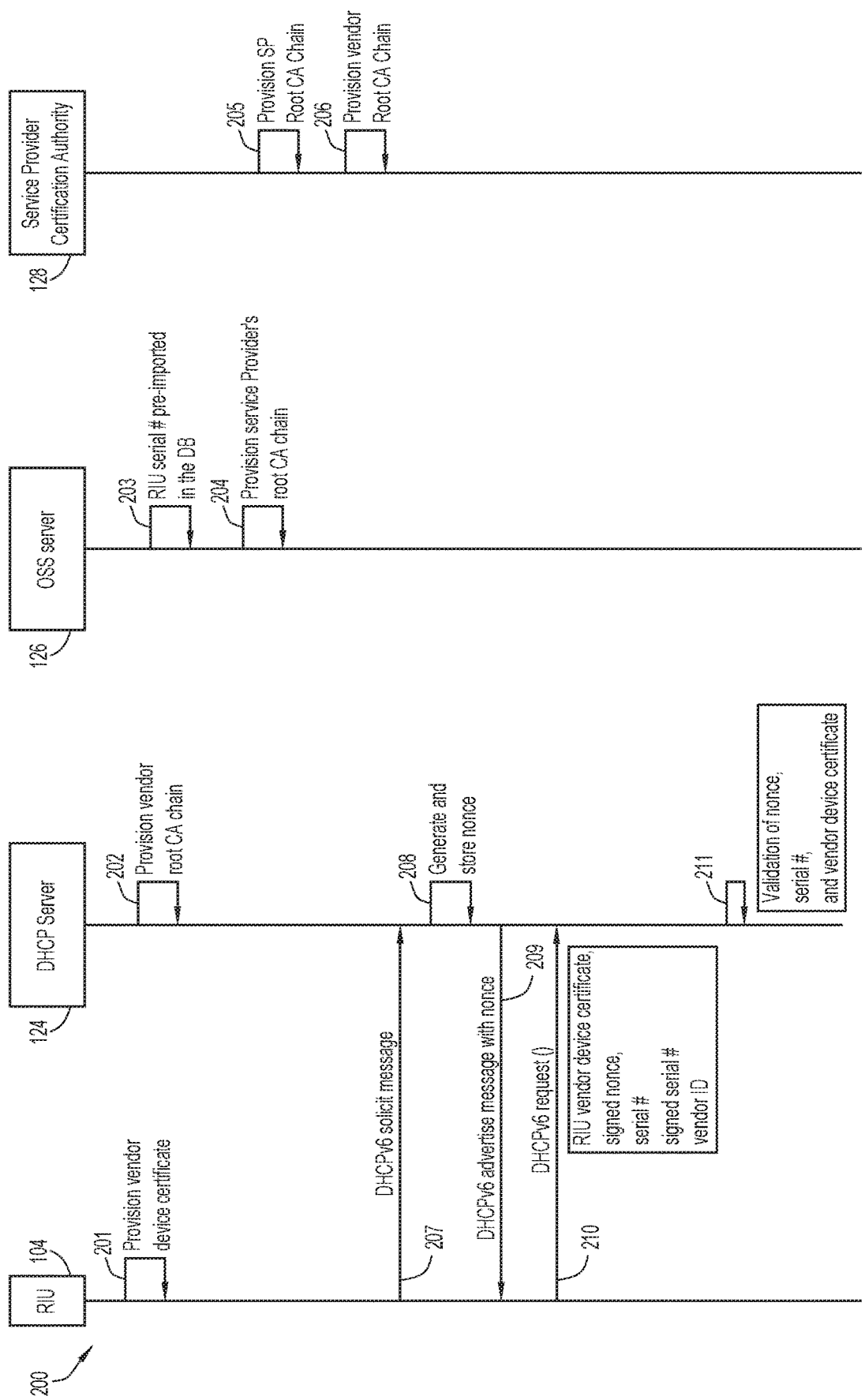
FIGS. 2A and 2B are a message sequence diagram illustrating a flow associated with secure onboarding of the RIU of FIG. 1A, according to an example embodiment.
Figure 2B:
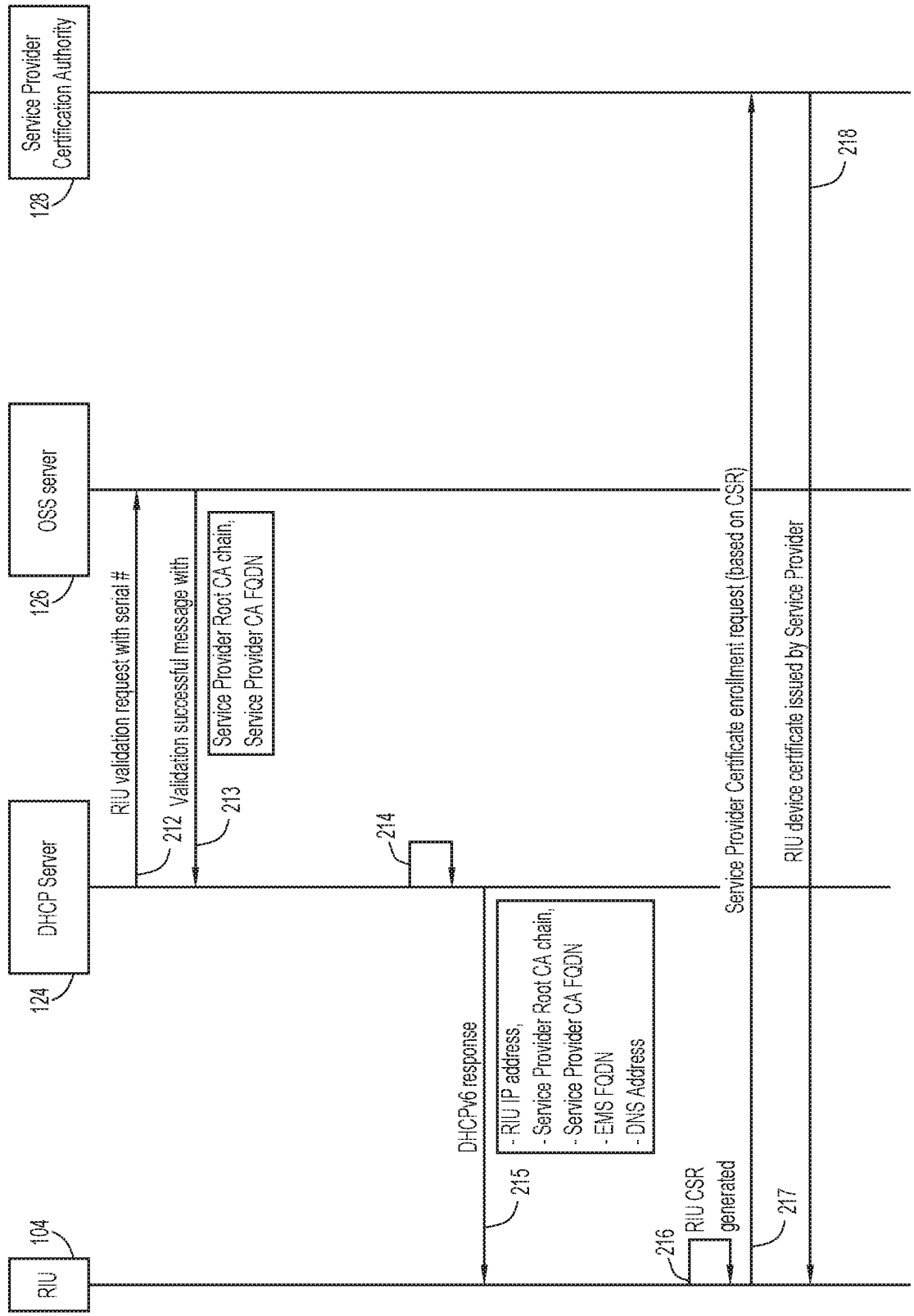

Consider example operational details, as discussed for FIGS. 2A and 2B, which are a message sequence diagram illustrating a flow 200 associated with secure onboarding of the RIU 104 of FIG. 1A, according to an example embodiment. FIGS. 2C and 2D are diagrams illustrating example message parameters that may be utilized for various messages illustrated in FIGS. 2A and 2B, according to an example embodiment. Reference may be made to FIGS. 2C and 2D in association with features discussed for FIGS. 2A and 2B. FIGS. 2A-2B include RIU 104, DHCP server 124, OSS server 126, and SP CA entity 128.

At 201, consider that RIU 104 is provisioned (e.g., configured, installed, etc.) with the RIU vendor device certificate 160 issued by the MU 104 vendor. At 202, the MU vendor root CA certificate chain 150 is provisioned for DHCP server 124. In at least one embodiment, DHCP server 124 may obtain the MU vendor root CA chain 150 from a publicly provided location (e.g., a vendor configured URL, etc.) provided by the vendor. At 203, OSS server 126 is provisioned with the MU S/N list 170 of all the RIUs, including S/N 123456789 of MU 104, that are expected to be connected to the SP network 120. At 204, the SP root CA chain 140 is provisioned for OSS server 126. At 205, the SP root CA chain 140 and the SP CA private key (e.g., 'sp-ca-pri-key') are provisioned for the SP CA entity 128. At 206, the MU vendor root CA certificate chain is provisioned for the SP CA 128.

In various embodiments, the provisioning of serial number information, root CA certificate chains, certificates, etc. as discussed for 201-206 can be performed manually by a human operator and/or automatically during power-on/reset of a device, at pre-defined intervals, as new sites are deployed, etc. Many options for the provisioning can be envisioned. Thus, operations may be performed in any order and/or at any time in accordance with embodiments herein.

At 207, the RIU 104 may begin an enhanced IPv6 address assignment process by generating and transmitting a DHCPv6 solicit message to the DHCP server 124 connected on the same network segment. At 208, the DHCP server 124 may generate a random nonce and may store it locally. In at least one embodiment, the random nonce may be generated via random number generation logic provisioned for DHCP server 124 using a seed value, such as a Media Access Control (MAC) address for MU 104, that is included in the DHCPv6 solicit message obtained by the DHCP server 124. At 209, the DHCP server 124 generates and transmits a DHCPv6 advertise message that includes the nonce that was generated for RIU 104 at 208.

At 210, the RIU 104 signs the nonce and its serial number (e.g., '123456789') with its private key (e.g., 'riu123456789-pri-key') and a SHA256 hash algorithm, thereby creating an encrypted/signed nonce and an encrypted/signed serial number and sends an enhanced DHCPv6 request message to DHCP server 124 that includes, at least in part, the RIU vendor device certificate 160, the signed none, the signed serial number, the (plain/non-encrypted) serial number, and the vendor ID (e.g., 'Vendor 1111'). The vendor ID can be carried in an Enterprise number field of the request and may be used by the DHCP server 124 to identify vendors for processing various request sub-options. It is to be understood that other information may be carried in the enhanced DHCPv6 request message (e.g., in accordance with DHCPv6 processes as prescribed by RFC 8415).

In at least one embodiment, an MU plain/non-encrypted serial number, an MU signed serial number, an MU signed nonce, and an RIU vendor device certificate can be carried vendor specific information of a DHCPv6 request message as sub-option information. Referring to FIG. 2C, FIG. 2C is a schematic diagram illustrating example details associated with vendor specific information associated with DHCPv6 option 17 that can be carried in various sub-option fields of an enhanced DHCPv6 request message. Guidelines for utilizing DHCPv6 option 17 are prescribed by RFC 8415.

In at least one embodiment, a new MU Serial Number field 220 can be utilized (e.g., having a new vendor specific sub-option code of 66) to carry a plain/non-encrypted serial number for an MU as in an American Standard Code for Information Interchange (ASCII) string representation format of the MU serial number. In at least one embodiment, a new Signed MU Serial Number field 221 can be utilized (e.g., having a new vendor specific sub-option code of 67) to carry a signed MU serial number for an RIU in a Base64 format of the signed RIU serial number.

In at least one embodiment, a new Vendor-MU-Certificate field 222 can be utilized (e.g., having a new vendor specific sub-option code of 68) to carry an MU vendor device certificate in a Privacy-Enhanced Mail (PEM) format, as prescribed by RFC 7468. In at least one embodiment, a new Signed Nonce field 223 can be utilized (e.g., having a new vendor specific sub-option code of 69) to carry a signed nonce for an RIU in a Base64 format.

It is to be understood that the sub-option codes described herein as provided for example purposes only and are not meant to limit the broad scope of the present disclosure. Other sub-option codes may be utilized to carry any of an MU plain/non-encrypted serial number, an MU signed serial number, an MU signed nonce, and an MU vendor device certificate to facilitate the enhanced certificate-based techniques provided by embodiments herein. Similarly, it is to be understood that the formats of any information carried in an enhanced DHCPv6 request message can be utilized and are not limited to the formats described herein.

Returning to FIG. 2A, at 211, the DHCP server 124 performs various validation operations based on the obtained DHCPv6 request message. The validation operations at 211 can include the DHCP server 124 validating the MU vendor device certificate 160 using the MU vendor root CA chain 150 as provisioned at 202. In at least one embodiment, the MU vendor device certificate 160 can be validated by the DHCP server 124 decrypting the RIU's digital signature (e.g., 'riu123456789-ds') using the vendor root CA public key (e.g., 'ven-ca-pub-key') to obtain a first result 'H1'. Next, the DHCP server 124 can compute a hash of the RIU's digital identity (e.g., fields 161 as shown in FIG. 1D) using the vendor root CA public key to obtain a second result 'H2'. The DHCP server 124 can successfully validate the RIU vendor device certificate 160 based on a determination that H1=H2, otherwise, if H1≠H2, then the certificate is not successfully validated.

The validation operations at 211 can further include the DHCP server 124 validating the signed nonce by decrypting it using the public key contained in the MU vendor device certificate 160 (e.g., 'riu123456789-pub-key') to generate a non-encrypted nonce and matching the non-encrypted nonce against the nonce as previously generated/stored by the DHCP server 124 at 208.

Further, the validation operations at 211 can include the DHCP server 124 validating the signed serial number by decrypting it using the public key contained in the RIU vendor device certificate 160 (e.g., 'riu123456789-pub-key') to generate a local non-encrypted serial number and matching the local non-encrypted serial number against the plain/non-encrypted serial number received in the DHCPv6 request message. The serial number validation can be performed to ensure that any tampering of the serial number has been avoided during transit of the request message. If any of the validation operations may fail, the operations may stop with the RIU not being allowed to onboard to the SP network.

At 212, as illustrated in FIG. 2B, the DHCP server 124 generates and transmits a serial number validation request to the OSS server 126 that includes the plain/non-encrypted MU serial number obtained by the DHCP server 124 at 210. At 213, the OSS server 126 performs a lookup using the RIU serial number against the RIU S/N list 170 and, upon confirming matching the MU 104 serial number to a corresponding number contained in the RIU S/N list 170, the OSS server 126 returns a validation successful message to the DHCP server 124 that includes the SP root CA chain 140 and a Fully Qualified Domain Name (FQDN) for the root SP CA 128.

Upon successfully performing the validation operations at 211 and successfully performing the validation of the RIU 104 serial number via OSS server 126 at 212-213, the DHCP server may, at 214, assign an IPv6 address to RIU 104 (using DHCPv6 processes as prescribed by RFC 8415) and generate, for transmission to MU 104, an enhanced DHCPv6 response message that includes, at least in part, the IPv6 address for MU 104, the SP root CA chain 150, the SP CA FQDN, and, additionally an Element Management System (EMS) FQDN and a Domain Name System (DNS) server address. The EMS typically consists of systems and applications for managing network elements (NE) on the network element-management layer (NEL) of the Telecommunications Management Network (TMN) model. It is to be understood that other information may be carried in the enhanced DHCPv6 response message (e.g., in accordance with DHCPv6 processes as prescribed by RFC 8415). At 215, the DHCP server 124 transmits the enhanced DHCPv6 response message to RIU 104 including the IPv6 address for MU 104, the SP root CA chain 140, the SP CA FQDN, the EMS FQDN, and the DNS address.

In at least one embodiment, an SP root CA chain and the EMS FQDN/URL can be carried in vendor specific information of a DHCPv6 reply or response message as sub-option information. Referring to FIG. 2D, FIG. 2D is a schematic diagram illustrating example details associated with vendor specific information associated with DHCPv6 option 17 that can be carried in various sub-option fields of an enhanced DHCPv6 reply/response message.

In at least one embodiment, a new Root CA Server Issuer Certificate field 224 can be utilized (e.g., having a new vendor specific sub-option code of 70) to carry an SP root CA certificate chain in a PEM format. In at least one embodiment, existing sub-option 10 can be utilized to carry the EMS FQDN/URL.

Returning to FIG. 2B, at 216, RIU 104 generates a certificate signing request (CSR) to enroll to the service provider's certification authority, SP CA 128, using techniques now known in the art and/or hereafter developed. At 217, MU 104 sends a device certificate enrollment request to the SP CA 128 based on the CSR and using the SP CA FQDN received in the enhanced DHCPv6 response message at 215. At 218, the SP CA issues the RIU device certificate 180 and sends the certificate to the MU 104 based on the enrollment request and the MU 104 is successfully onboarded to the SP network 120. The SP issued RIU device certificate may have similar fields as discussed for the MU vendor device certificate 160 in which the fields may include SP-specific information, parameters, etc. that provide for securing future communications of the MU 104 in the SP network 120.

Thus, embodiments herein provide various enhancements including, but not limited to, enhancing a DHCP server, such as DHCP server 124, to generate and store a nonce locally and also send the nonce parameter in a DHCP advertise message to a DHCP client, such as MU 104. Embodiments herein may further provide for enhancing a DHCP server, such as DHCP server 124, to accept an RIU vendor device certificate, a signed nonce, a plain/non-encrypted serial number, and a signed serial number in an enhanced DHCPv6 request message (e.g., using various vendor specific sub-options) and then validate them locally. Embodiments herein may further provide for enhancing a DHCP server, such as DHCP server 124, to validate an MU serial number against an OSS server database. Embodiments herein may further provide for enhancing a DHCP server, such as DHCP server 124, to support sending an enhanced DHCPv6 response using vendor specific sub-options to provide a SP root CA chain and EMS FQDN/URL to a DHCP client, such as MU 104, to facilitate secure onboarding and future communications for the client with an SP network.

Figure 3:
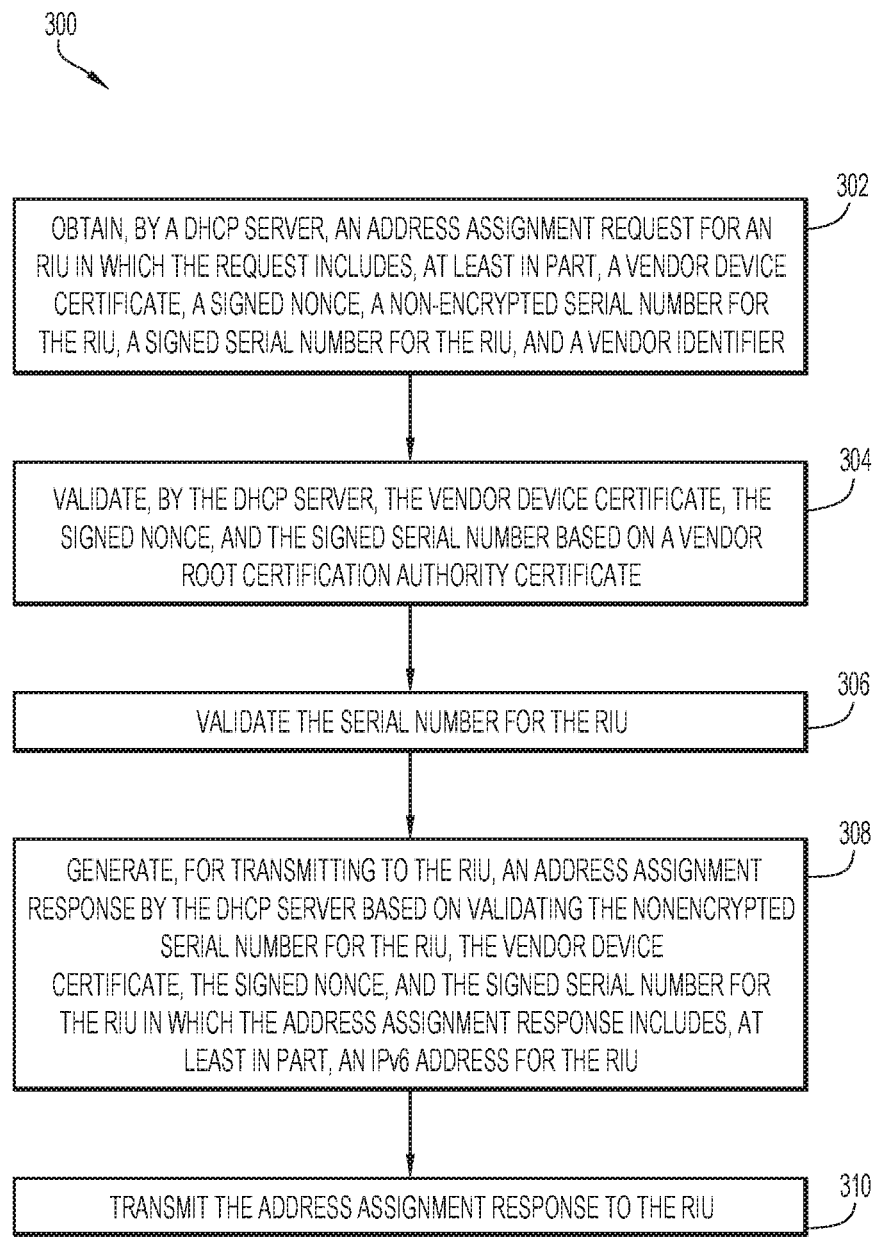
FIG. 3 is a flow chart depicting a method, according to an example embodiment.

Referring to FIG. 3, FIG. 3 is a flow chart depicting a method 300 according to an example embodiment. In particular, method 300 illustrates example operations that may be performed, at least in part, by a DHCP server, such as DHCP server 124 to facilitate secure onboarding for an MU, such as RIU 104, using certificate-based techniques, as discussed herein.

At 302, the method may include obtaining, by the Dynamic Host Configuration Protocol (DHCP) server, an address assignment request (e.g., a DHCPv6 request) for a radio interface unit (MU) in which the address assignment request includes, at least in part, a vendor device certificate, a signed nonce, a (plain/non-encrypted) serial number for the MU, a signed serial number for the MU, and a vendor identifier. In at least one embodiment, the vendor device certificate (e.g., MU vendor device certificate 160), the signed nonce, the (plain/non-encrypted) serial number for the MU, and the signed serial number for the RIU can be carried in vendor specific sub-options of a DHCPv6 request message (e.g., as discussed at least for FIG. 2C).

At 304, the method may include validating, by the DHCP server, the vendor device certificate, the signed nonce, and the signed serial number for the RIU based on a vendor root certification authority certificate (e.g., based on a public key contained in the vendor root certification authority certificate, such as the MU vendor root CA chain 150). In one embodiment, the validating the signed nonce may include decrypting the signed nonce utilizing a public key of the vendor root certification authority certificate to generate a non-encrypted nonce and comparing the non-encrypted nonce to a nonce generated by the DHCP server for the MU in which the signed nonce may be validated based on the non-encrypted nonce matching the nonce generated by the DHCP server for the RIU. In at least one embodiment, validating the signed serial number may include decrypting the signed serial number for the MU utilizing a public key of the vendor root certification authority certificate to generate a local non-encrypted serial number for the RIU and comparing the locally generated non-encrypted serial number for the MU to the non-encrypted serial number for the MU contained in the address assignment request in which the signed serial number for the RIU may be validated based on the locally generated non-encrypted serial number for the RIU matching the non-encrypted serial number for the MU contained in the address assignment request.

At 306, the method may include validating the non-encrypted serial number for the RIU. In at least one embodiment, validating the non-encrypted serial number for the RIU may include the DHCP server communicating the non-encrypted serial number to an OSS server, such as OSS server 126, and the OSS server performing a lookup on an RIU serial number list to determine whether there is a match (e.g., the serial number received from the DHCP server matches a serial number contained in the list for the OSS server). Upon determining that there is a match, the non-encrypted serial number for the RIU is validated and the DHCP server obtains an indication of such from the OSS server that the serial number is validated.

At 308, the method may include generating, for transmitting to the RIU, an address assignment response by the DHCP server (e.g., a DHCPv6 response) based on validating the non-encrypted serial number for the RIU, the vendor device certificate, the signed nonce, and the signed serial number for the RIU in which the address assignment response includes, at least in part, an IPv6 address for the RIU. The address assignment response may further include an SP root CA chain, an FQDN for an SP CA, an EMS FQDN/URL, and a DNS address. At 310, the method may include transmitting the assignment response to the MU. Upon obtaining the response, the MU may complete its onboarding by generating a CSR, communicating an enrollment request to the SP CA, and obtaining an MU device certificate issued by the SP as discussed for various embodiments herein.

Figure 4:
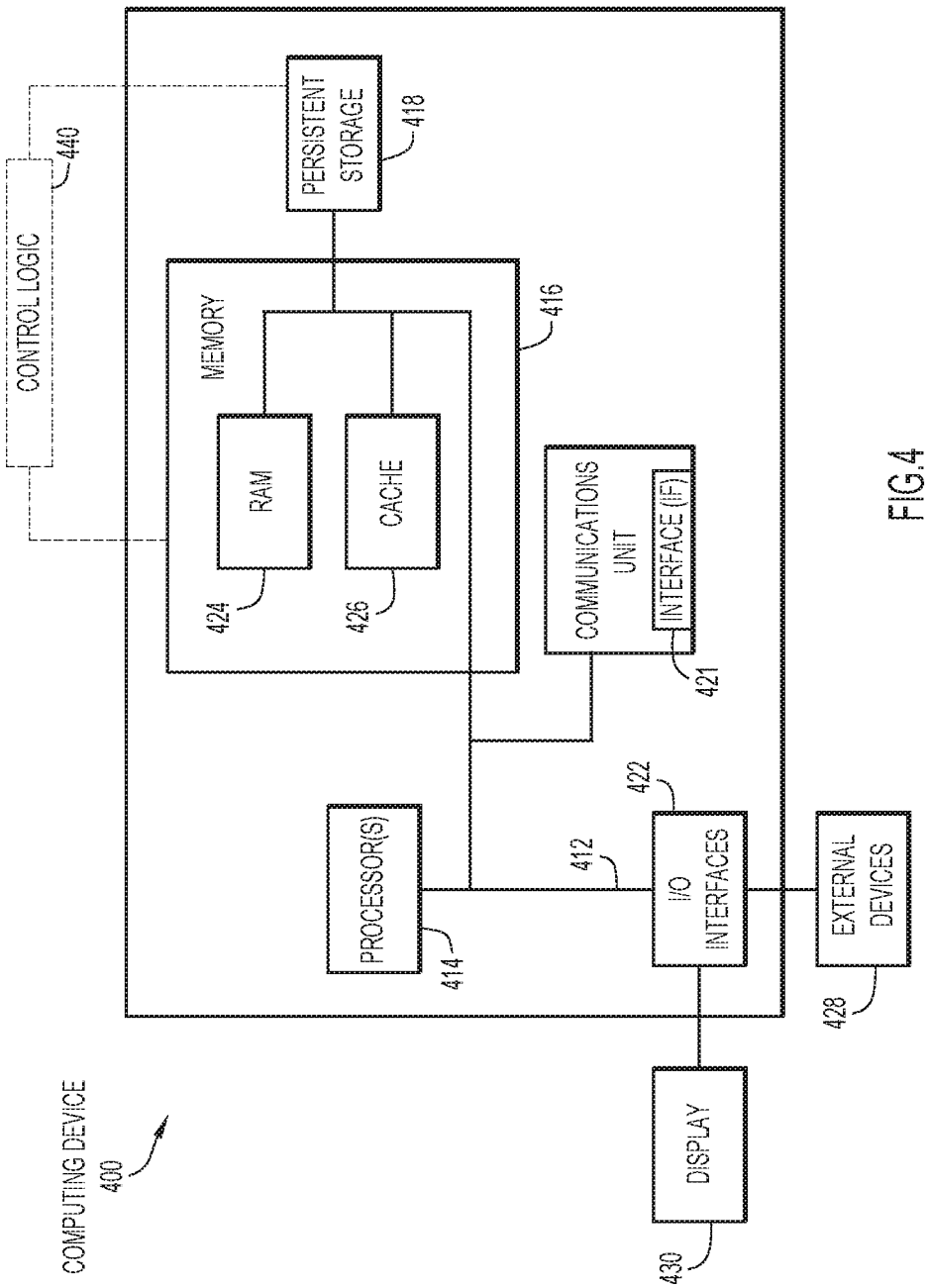
FIG. 4 is a hardware block diagram of a computing device that may perform functions associated with any combination of operations, in connection with the techniques depicted in FIGS. 1A-3.

Referring to FIG. 4, FIG. 4 illustrates a hardware block diagram of a computing device 400 that may perform functions associated with certificate-based onboarding operations discussed herein in connection with the techniques depicted in FIGS. 1-3. In various embodiments, a computing device, such as computing device 400 or any combination of computing devices 400, may be configured as any of an DHCP server, an SP CA entity, an OSS server, an MU, etc. as discussed for the techniques depicted in connection with FIGS. 1-3.

It should be appreciated that FIG. 4 provides only an illustration of one embodiment and does not imply any limitations with regard to the environments in which different embodiments may be implemented. Many modifications to the depicted environment may be made.

As depicted, the computing device 400 includes a bus 412, which provides communications between computer processor(s) 414, memory 416, persistent storage 418, one or more communications units 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media, which can be inclusive on non-transitory computer readable storage media. In the depicted embodiment, memory 416, which may be inclusive of one or more memory element(s), includes random access memory (RAM) 424 and cache memory 426. In general, memory 416 can include any suitable volatile or non-volatile computer readable storage media. Instructions for control logic 440 may be stored in memory 416 and/or persistent storage 418 for execution by processor(s) 414.

When the processor(s) 414 execute control logic 440, policy combining logic 442, and/or policy enforcement logic 444, the processor(s) 614 are caused to perform the operations described above in connection with FIGS. 1-3. For example, if computing device 400 is implemented as the DHCP server 124 of the embodiment of FIG. 1, the control logic 440 may be implemented such that when executing the control logic 440, the processor(s) 414 are caused to perform operations associated with obtaining an address assignment request for an MU (e.g., MU 104; validating a vendor device certificate, a signed nonce, and a signed serial number for the RIU based on a root certification authority certificate; validating the non-encrypted serial number for the MU; and generating, for transmitting to the RIU, an address assignment response by the DHCP server based on validating the non-encrypted serial number for the RIU, the vendor device certificate, the signed nonce, and the signed serial number for the MU in which the address assignment response includes, at least in part, an IPv6 address for the RIU.

If computing device 400 is implemented as OSS server 126, the control logic 440 may be implemented such that when executing the control logic 440, the processor(s) 414 are caused to perform operations associated with MU serial number validations, as discussed herein. If computing device 400 is implemented as SP CA 128, the control logic 440 may be implemented such that when executing the control logic, the processor(s) 414 are caused to perform operations associated with RIU enrollment, as discussed herein. If computing device 400 is implemented as RIU 104, the control logic 440 may be implemented such that when executing the control logic 440, the processor(s) 414 are caused to perform operations associated with requesting address assignment, onboarding, etc. as discussed herein.

One or more programs and/or other logic may be stored in persistent storage 418 for execution by one or more of the respective computer processors 414 via one or more memory element(s) of memory 416. The persistent storage 418 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications units 420, in these examples, provides for communications with other data processing systems, networks, and/or devices. In these examples, each communications unit 420 may include at least one interface (IF) 421, which may facilitate communications with systems, networks, and/or devices utilizing any combination of cellular hardware, software, etc. (e.g., 4G RANs, 5G RANs, etc. as discussed herein), Wi-Fi hardware, software, etc. (e.g., Wi-Fi radios), wired hardware, software, etc. (e.g., network interface cards, etc.) to facilitate one or more connections for communications discussed herein. Accordingly, communications units 420 may provide communications through the use of any combination of physical and/or wireless communications links.

I/O interface(s) 422 allows for input and output of data with other devices that may be connected to computing device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

In one form, a computer-implemented method is provided that may include obtaining, by a Dynamic Host Configuration Protocol (DHCP) server, an address assignment request for a radio interface unit (RIU), wherein the address assignment request comprises a vendor device certificate, a signed nonce, a non-encrypted serial number for the RIU, a signed serial number for the RIU, and a vendor identifier; validating the vendor device certificate, the signed nonce, and the signed serial number for the RIU by the DHCP server based on a vendor root certification authority certificate; validating the non-encrypted serial number for the RIU; and generating, for transmitting to the RIU, an address assignment response by the DHCP server based on validating the non-encrypted serial number for the RIU, the vendor device certificate, the signed nonce, and the signed serial number for the RIU, wherein the address assignment response comprises an Internet Protocol version 6 (IPv6) address for the RIU. The method may further include transmitting the address assignment response toward the RIU by the DHCP server.

In at least one instance, the method may further include prior to obtaining the address assignment request, obtaining, by the DHCP server, a solicitation message communicated from the RIU; generating a nonce by the DHCP server; and transmitting an advertise message toward the RIU that comprises the nonce. In at least one instance, the nonce may be generated based, least in part, on a Media Access Control (MAC) address of the RIU.

In at least one instance, the address assignment response may further include a service provider root certification authority certificate and a Fully Qualified Domain Name (FQDN) for a service provider certification authority entity.

In at least one instance, validating the signed nonce may include decrypting the signed nonce utilizing a public key of the root certification authority certificate to generate a non-encrypted nonce and comparing the non-encrypted nonce to a nonce generated by the DHCP server for the RIU in which the signed nonce may be validated based on the non-encrypted nonce matching the nonce generated by the DHCP server for the RIU.

In at least one instance, validating the signed serial number may include decrypting the signed serial number for the RIU utilizing a public key of the root certification authority certificate to generate a local non-encrypted serial number for the RIU and comparing the local non-encrypted serial number for the RIU to the non-encrypted serial number for the RIU contained in the address assignment request in which the signed serial number for the RIU may be validated based on the local non-encrypted serial number for the RIU matching the non-encrypted serial number for the RIU contained in the address assignment request.

In at least one instance, validating the non-encrypted serial number for the RIU may include performing a lookup between the non-encrypted serial number for the RIU and an RIU serial number database in which the non-encrypted serial number for the RIU may be validated if it is contained in the RIU serial number database. In at least one implementation, the lookup may be performed by an Operations Support System (OSS) server.

In at least one instance, the address assignment request may be a DHCP version 6 (DHCPv6) request and the address assignment response may be a DHCPv6 response. In at least one instance, the vendor device certificate, the signed nonce, the non-encrypted serial number for the RIU, the signed serial number for the RIU, and the vendor identifier may be carried in vendor specific information sub-options for the DHCPv6 request. In at least one instance, a service provider root certification authority certificate may be carried in a vendor specific information sub-option for the DHCPv6 response.

In summary, presented herein are certificate-based RIU onboarding techniques through which an RIU can be securely onboarded for a service provider network and through which secure communications can be provided for the RIU with the service provider network. In addition, embodiments herein may be extended to other clients that seek to connect to the service provider network.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein (e.g., certificates, keys, root CA chains, lists, etc.) may be stored within any conventional or other data structures (e.g., files, arrays, lists, stacks, queues, records, etc.) and may be stored in any desired storage unit (e.g., database, data or other repositories, queue, etc.). The data or information transmitted between entities (e.g., certificates, keys, root CA chains, lists etc.) may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by a Dynamic Host Configuration Protocol (DHCP) server, an address assignment request for a radio interface unit (RIU) of a Remote Radio Head (RRH) that interfaces, via a top-of-rack switch, with a virtualized distributed unit (vDU) of a virtualized Radio Access Network (vRAN), wherein the address assignment request comprises a vendor device certificate, a signed nonce, a non-encrypted serial number for the RIU, a signed serial number for the RIU, and a vendor identifier identifying a vendor or manufacturer of the RIU;
    validating the vendor device certificate, the signed nonce, and the signed serial number for the RIU by the DHCP server based, at least in part, on a vendor root certification authority certificate;
    validating the non-encrypted serial number for the RIU;
    generating an address assignment response by the DHCP server based on validating the non-encrypted serial number for the RIU, the vendor device certificate, the signed nonce, and the signed serial number for the RIU, wherein the address assignment response comprises an Internet Protocol version 6 (IPv6) address for the RIU, a service provider root certification authority certificate, and a Fully Qualified Domain Name (FQDN) for a service provider certification authority entity; and
    transmitting the address assignment response toward the RIU by the DHCP server.

2. The method of claim 1, further comprising:
    prior to obtaining the address assignment request, obtaining, by the DHCP server, a solicitation message communicated from the MU;
    generating a nonce by the DHCP server; and
    transmitting an advertise message toward the MU that comprises the nonce.

3. The method of claim 2, wherein the nonce is generated based, at least in part, on a Media Access Control (MAC) address of the RIU.

4. The method of claim 1, wherein validating the signed nonce includes:
    decrypting the signed nonce utilizing a public key of the vendor device certificate to generate a non-encrypted nonce; and
    comparing the non-encrypted nonce to a nonce generated by the DHCP server for the RIU, wherein the signed nonce is validated based on the non-encrypted nonce matching the nonce generated by the DHCP server for the RIU.

5. The method of claim 1, wherein validating the signed serial number includes:
    decrypting the signed serial number for the RIU utilizing a public key of the vendor device certificate to generate a local non-encrypted serial number for the RIU; and
    comparing the local non-encrypted serial number for the RIU to the non-encrypted serial number for the RIU contained in the address assignment request, wherein the signed serial number for the RIU is validated based on the local non-encrypted serial number for the RIU matching the non-encrypted serial number for the RIU contained in the address assignment request.

6. The method of claim 1, wherein validating the non-encrypted serial number for the RIU includes performing a lookup between the non-encrypted serial number for the RIU and an RIU serial number database, wherein the non-encrypted serial number for the RIU is validated if it is contained in the RIU serial number database.

7. The method of claim 6, wherein the lookup is performed by an Operations Support System server.

8. The method of claim 1, wherein the address assignment request is a DHCP version 6 (DHCPv6) request and the address assignment response is a DHCPv6 response.

9. The method of claim 8, wherein the vendor device certificate, the signed nonce, the non-encrypted serial number for the RIU, the signed serial number for the RIU, and the vendor identifier are carried in vendor specific information sub-options for the DHCPv6 request.

10. The method of claim 8, wherein a service provider root certification authority certificate is carried in a vendor specific information sub-option for the DHCPv6 response.

11. The method of claim 1, further comprising:
    obtaining a certificate signing request from the RIU;
    issuing an RIU device certificate by a service provider; and
    transmitting the service provider issued RIU device certificate to the RIU to facilitate secure onboarding of the RIU to a mobile network operated by the service provider.

12. The method of claim 1, wherein the address assignment response further comprises a Domain Name System (DNS) address and an Element Management System (EMS) FQDN.

13. One or more non-transitory computer readable storage media encoded with instructions that, when executed by a processor, cause the processor to perform operations, comprising:
    obtaining, by a Dynamic Host Configuration Protocol (DHCP) server, an address assignment request for a radio interface unit (RIU) of a Remote Radio Head (RRH) that interfaces, via a top-of-rack switch, with a virtualized distributed unit (vDU) of a virtualized Radio Access Network (vRAN), wherein the address assignment request comprises a vendor device certificate, a signed nonce, a non-encrypted serial number for the RIU, a signed serial number for the RIU, and a vendor identifier identifying a vendor or manufacturer of the RIU;
    validating the vendor device certificate, the signed nonce, and the signed serial number for the RIU by the DHCP server based, at least in part, on a vendor root certification authority certificate;
    validating the non-encrypted serial number for the RIU;
    generating an address assignment response by the DHCP server based on validating the non-encrypted serial number for the RIU, the vendor device certificate, the signed nonce, and the signed serial number for the RIU, wherein the address assignment response comprises an Internet Protocol version 6 (IPv6) address for the RIU, a service provider root certification authority certificate, and a Fully Qualified Domain Name (FQDN) for a service provider certification authority entity; and
    transmitting the address assignment response toward the RIU by the DHCP server.

14. The media of claim 13, the operations further comprising:
    prior to obtaining the address assignment request, obtaining, by the DHCP server, a solicitation message communicated from the RIU;
    generating a nonce by the DHCP server; and
    transmitting an advertise message toward the RIU that comprises the nonce.

15. The media of claim 13, wherein validating the signed nonce includes:
   decrypting the signed nonce utilizing a public key of the vendor device certificate to generate a non-encrypted nonce; and
   comparing the non-encrypted nonce to a nonce generated by the DHCP server for the RIU, wherein the signed nonce is validated based on the non-encrypted nonce matching the nonce generated by the DHCP server for the RIU.

16. The media of claim 13, wherein validating the signed serial number includes:
   decrypting the signed serial number for the RIU utilizing a public key of the vendor device certificate to generate a local non-encrypted serial number for the RIU; and
   comparing the local non-encrypted serial number for the RIU to the non-encrypted serial number for the RIU contained in the address assignment request, wherein the signed serial number for the RIU is validated based on the local non-encrypted serial number for the RIU matching the non-encrypted serial number for the RIU contained in the address assignment request.

17. A system comprising:
   at least one memory element for storing data; and
   at least one processor for executing instructions associated with the data, wherein executing the instructions causes the system to perform operations, comprising:
   obtaining, by a Dynamic Host Configuration Protocol (DHCP) server, an address assignment request for a radio interface unit (RIU) of a Remote Radio Head (RRH) that interfaces, via a top-of-rack switch, with a virtualized distributed unit (vDU) of a virtualized Radio Access Network (vRAN), wherein the address assignment request comprises a vendor device certificate, a signed nonce, a non-encrypted serial number for the RIU, a signed serial number for the RIU, and a vendor identifier identifying a vendor or manufacturer of the RIU;
   validating the vendor device certificate, the signed nonce, and the signed serial number for the RIU by the DHCP server based, at least in part, on a vendor root certification authority certificate;
   validating the non-encrypted serial number for the RIU;
   generating an address assignment response by the DHCP server based on validating the non-encrypted serial number for the RIU, the vendor device certificate, the signed nonce, and the signed serial number for the RIU, wherein the address assignment response comprises an Internet Protocol version 6 (IPv6) address for the RIU, a service provider root certification authority certificate, and a Fully Qualified Domain Name (FQDN) for a service provider certification authority entity; and
   transmitting the address assignment response toward the RIU by the DHCP server.

18. The system of claim 17, the operations further comprising:
   prior to obtaining the address assignment request, obtaining, by the DHCP server, a solicitation message communicated from the RIU;
   generating a nonce by the DHCP server; and
   transmitting an advertise message toward the MU that comprises the nonce.

19. The system of claim 18, wherein the nonce is generated based, at least in part, on a Media Access Control (MAC) address of the RIU.

20. The system of claim 17, wherein the address assignment request is a DHCP version 6 (DHCPv6) request and the address assignment response is a DHCPv6 response and wherein the vendor device certificate, the signed nonce, the non-encrypted serial number for the RIU, the signed serial number for the RIU, and the vendor identifier are carried in vendor specific information sub-options for the DHCPv6 request.

* * * * *

UNITED STATES PATENT AND TRADEMARK OFFICE
CERTIFICATE OF CORRECTION

PATENT NO. : 11,870,768 B1
APPLICATION NO. : 16/845531
DATED : January 9, 2024
INVENTOR(S) : Devendra Kumar Vishwakarma et al.

It is certified that error appears in the above-identified patent and that said Letters Patent is hereby corrected as shown below:

In the Claims

Claim 2, Column 19, Lines 35-37, please replace "from the MU; generating a nonce by the DHCP server; and transmitting an advertise message toward the MU that" with --from the RIU; generating a nonce by the DHCP server; and transmitting an advertise message toward the RIU that--

Claim 18, Column 22, Line 24, please replace "transmitting an advertise message toward the MU that" with --transmitting an advertise message toward the RIU that--

Signed and Sealed this
Twenty-seventh Day of February, 2024

Katherine Kelly Vidal
*Director of the United States Patent and Trademark Office*